(12) United States Patent
Wang (10) Patent No.: US 11,495,162 B2
(45) Date of Patent: Nov. 8, 2022

(54) PANEL DISPLAY OPTIMIZATION METHOD, DISPLAY PANEL, AND STORAGE MEDIUM

(71) Applicant: TCL China Star Optoelectronics Technology Co., Ltd., Guangdong (CN)

(72) Inventor: Geng Wang, Guangdong (CN)

(73) Assignee: TCL China Star Optoelectronics Technology Co. Ltd., Shenzhen (CN)

( * ) Notice: Subject to any disclaimer, the term of this patent is extended or adjusted under 35 U.S.C. 154(b) by 384 days.

(21) Appl. No.: 16/651,731

(22) PCT Filed: Mar. 24, 2020

(86) PCT No.: PCT/CN2020/080785
§ 371 (c)(1),
(2) Date: Mar. 27, 2020

(87) PCT Pub. No.: WO2021/128615
PCT Pub. Date: Jul. 1, 2021

(65) Prior Publication Data
US 2021/0407366 A1    Dec. 30, 2021

(30) Foreign Application Priority Data
Dec. 27, 2019 (CN) .......................... 201911371255.8

(51) Int. Cl.
*G06T 5/00* (2006.01)
*G09G 3/20* (2006.01)
*H04N 1/409* (2006.01)

(52) U.S. Cl.
CPC .......... *G09G 3/2007* (2013.01); *G06T 5/002* (2013.01); *G06T 5/00* (2013.01); *G09G 2320/0686* (2013.01); *H04N 1/409* (2013.01)

(58) Field of Classification Search
None
See application file for complete search history.

(56) References Cited

U.S. PATENT DOCUMENTS

2017/0116956 A1* 4/2017 Yang ........................ G09G 5/10
2017/0301081 A1* 10/2017 Yang ........................ G06T 7/11
(Continued)

FOREIGN PATENT DOCUMENTS

| CN | 101685611 A | 3/2010 |
|---|---|---|
| CN | 107301851 A | 10/2017 |

(Continued)

*Primary Examiner* — Yanna Wu
(74) *Attorney, Agent, or Firm* — Luedeka Neely Group, P.C.

(57) ABSTRACT

The present disclosure provides a panel display optimization method, a display panel, and a storage medium. The panel display optimization method includes a region acquisition step, an adjustment step, and a high-low gray level step. The present disclosure is used to make processing coefficients of high-low gray levels of pixels to be processed having farther boundaries be greater according to distances from the pixels to be processed to the boundaries of a first pixel region, a second pixel region, and a third pixel region, that is, according to forward transitional spaces and backward transitional spaces to adjust the processing coefficients of the high-low gray levels. This further reduces graininess of the panel and improves visual quality of the panel after performing high-low gray level processing on adjusted pixels.

9 Claims, 5 Drawing Sheets

(56) References Cited

U.S. PATENT DOCUMENTS

2018/0137321 A1* 5/2018 Jiang .................... G06T 7/12
2021/0399029 A1* 12/2021 Ohura ............... H01L 27/14643

FOREIGN PATENT DOCUMENTS

| CN | 109285521 A | 1/2019 |
| CN | 109817158 A | 5/2019 |
| JP | 2001350430 A | 12/2001 |
| JP | 5336406 B2 | 11/2013 |

* cited by examiner

PANEL DISPLAY OPTIMIZATION METHOD, DISPLAY PANEL, AND STORAGE MEDIUM

FIELD OF INVENTION

The present disclosure relates to the field of display technologies, and more particularly, to a panel display optimization method, a display panel, and a storage medium.

BACKGROUND OF INVENTION

Figure 1:
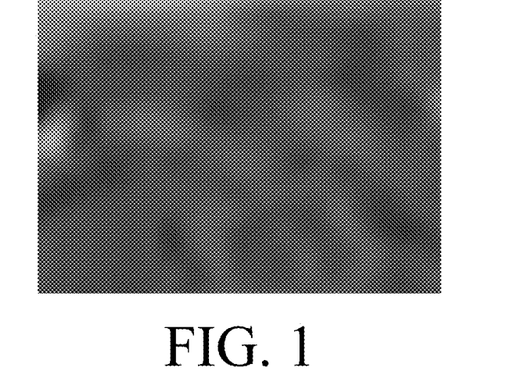
FIG. 1 is an image before high-low gray level processing in current technology.

In current technology, in order to achieve objectives of low cost and high transmittance, 4-domain pixel is the best layout of sub-pixels. However, panels with 4-domain pixels have a problem of serious color shift at wide viewing angles. An improved algorithm at wide viewing angles is developed to improve the color shift at wide viewing angles by substituting original image data (as shown in FIG. 1) with a pair of high and low gray levels (high-low, HL).

Figure 2:
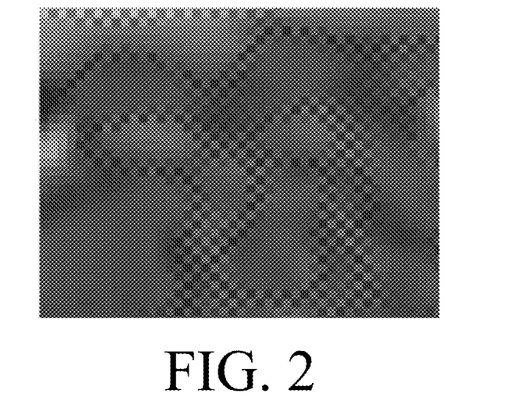
FIG. 2 is an image after high-low gray level processing in current technology.

Technical problem: introduction of HL gray levels causes a problem of graininess (as shown in FIG. 2) after images are processed. In order to reduce graininess, color detection functions are developed subsequently, and the functions reduce a certain degree of graininess by detecting colors and selectively performing HL processing in image regions. When a detected region requiring HL gray level processing is narrower in a horizontal direction, the graininess shown will appear, which is very abrupt and seriously affects visual effects of panels.

Therefore, the present disclosure provides a panel display optimization method, a display panel, and a storage medium to reduce the problem of graininess when performing high-low gray level processing, thereby improving display effects of display panels.

SUMMARY OF INVENTION

An objective of the present disclosure is to provide a panel display optimization method, a display panel, and a storage medium to reduce the problem of the graininess when performing high-low gray level processing, thereby improving display effects of display panels.

To achieve the above objective, the present disclosure provides a panel display optimization method. The method comprises following steps: a region acquisition step of acquiring a first pixel region, a second pixel region, and a third pixel region of an image, wherein the first pixel region is disposed between the second pixel region and the third pixel region, high-low gray level values in the first pixel region are 1, high-low gray level values in the second pixel region and the third pixel region are 0, the first pixel region comprises a pixel to be processed, the first pixel region is an N*M pixel matrix, the second pixel region is an N*L pixel matrix, and the third pixel region is an N*K pixel matrix; wherein, it needs to perform high-low gray level processing when the high-low gray level values are 1; an adjustment step of adjusting a processing coefficient of a high-low gray level according to distances from the pixel to be processed to boundaries of the first pixel region, the second pixel region, and the third pixel region, which is used to make a processing coefficient of a high-low gray level of a pixel to be processed having a farther boundary be greater; and a high-low gray level step of performing high-low gray level processing on the pixel to be processed according to the processing coefficient of the high-low gray level, wherein if the processing coefficient of the high-low gray level is greater, a high-low gray level value is greater.

Further, the adjustment step specifically comprises: a region changing step of converting the first pixel region, the second pixel region, and the third pixel region to a one-dimensional matrix; a first calculation step of calculating a forward transitional space coefficient (a) according to formula:

$$a = \frac{\text{space\_forward}}{V\_\text{region} * H\_\text{region\_b}} * P/256,$$

wherein space_forward is a pixel distance from the pixel to be processed toward the second pixel region in the one-dimensional matrix, H_region_b is a pixel distance from the pixel to be processed to the boundary of the second pixel region in the N-dimensional matrix of the region acquisition step, V_region is N pixel distances, and P is a forward control factor having a value of (0,1); a second calculation step of calculating a backward transitional space coefficient (b) according to formula:

$$b = \frac{\text{space\_backward}}{V\_\text{region} * H\_\text{region\_f}} * Q/256,$$

wherein space_backward is a pixel distance from the pixel to be processed toward the third pixel region in the one-dimensional matrix, H_region_f is a pixel distance from the pixel to be processed to the boundary of the third pixel region in the N-dimensional matrix of the region acquisition step, V_region is the N pixel distances, and Q is a backward control factor having a value of (0,1); and a third calculation step of calculating the processing coefficient of the high-low gray level of the pixel to be processed according to formula: c=a*b.

Further, in the region changing step, the conversion method is performed based on the pixel to be processed as a central point expanding to two sides in a same moving direction.

Further, the second pixel region and the third pixel region are bilaterally symmetrical about the first pixel region.

Further, before the region acquisition step, the method further comprises a preparation step of providing a display panel; wherein the display panel displays the image, and the first pixel region requiring the high-low gray level processing is detected by a color detection system of the display panel.

The present disclosure further provides a display panel which comprises a panel display optimization system. Wherein, the panel display optimization system comprises: a region acquisition unit configured to acquire a first pixel region, a second pixel region, and a third pixel region of an image, wherein the first pixel region is disposed between the second pixel region and the third pixel region, high-low gray level values in the first pixel region are 1, high-low gray level values in the second pixel region and the third pixel region are 0, the first pixel region comprises a pixel to be processed, the first pixel region is an N*M pixel matrix, the second pixel region is an N*L pixel matrix, and the third pixel region is an N*K pixel matrix; wherein, it needs to perform high-low gray level processing when the high-low gray level values are 1; an adjustment unit configured to adjust a processing coefficient of a high-low gray level according to distances from the pixel to be processed to boundaries of the first pixel region, the second pixel region, and the third pixel region, which is used to make an extent of a high-low gray level of a pixel to be processed having a farther boundary be greater; and a high-low gray level unit configured to perform high-low gray level processing on the pixel to be processed according to the processing coefficient of the high-low gray level.

Further, the display panel comprises a color detection system which is configured to detect the first pixel region requiring the high-low gray level processing when the display panel displays the image.

Further, the region acquisition unit, the adjustment unit, and the high-low gray level unit are integrated into a circuit board.

Further, the adjustment unit comprises: a region changing unit configured to convert the first pixel region, the second pixel region, and the third pixel region to a one-dimensional matrix; a first calculating unit configured to calculate a forward transitional space coefficient (a) according to formula:

$$a = \frac{space\_forward}{V\_region * H\_region\_b} * P/256,$$

wherein space_forward is a pixel distance from the pixel to be processed toward the second pixel region in the one-dimensional matrix, H_region_b is a pixel distance from the pixel to be processed to the boundary of the second pixel region in the N-dimensional matrix of the region acquisition step, V_region is N pixel distances, and P is a forward control factor having a value of (0,1); a second calculating unit configured to calculate a backward transitional space coefficient (b) according to formula:

$$b = \frac{space\_backward}{V\_region * H\_region\_f} * Q/256,$$

wherein space_backward is a pixel distance from the pixel to be processed toward the third pixel region in the one-dimensional matrix, H_region_f is a pixel distance from the pixel to be processed to the boundary of the third pixel region in the N-dimensional matrix of the region acquisition step, V_region is the N pixel distances, and Q is a backward control factor having a value of (0,1); and a third calculating unit configured to calculate the processing coefficient of the high-low gray level of the pixel to be processed according to formula: c=a*b.

The present disclosure further provides a storage medium, in which a computer program is stored, wherein the computer program causes a processor to execute the above method.

Beneficial effect: the present disclosure provides a panel display optimization method, a display panel, and a storage medium which are used to make processing coefficients of high-low gray levels of pixels to be processed having farther boundaries be greater according to distances from the pixels to be processed to the boundaries of the first pixel region, the second pixel region, and the third pixel region, that is, according to forward transitional spaces and backward transitional spaces to adjust the processing coefficients of the high-low gray levels. This further reduces overall graininess of the panel and improves visual quality of the panel after performing high-low gray level processing on adjusted pixels.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION OF PREFERRED EMBODIMENTS

The specific embodiments described with reference to the attached drawings are all exemplary and are intended to illustrate and interpret the present disclosure.

Embodiments of the present disclosure will be described in detail herein with reference to the accompanying drawings. The present disclosure may be embodied in many different forms and should not be construed as being limited to the specific embodiments set forth herein. The embodiments of the present disclosure are provided to explain the practical application of the present disclosure, so that those skilled in the art can understand various embodiments of the present disclosure and various modifications suitable for a specific intended application.

Figure 3:
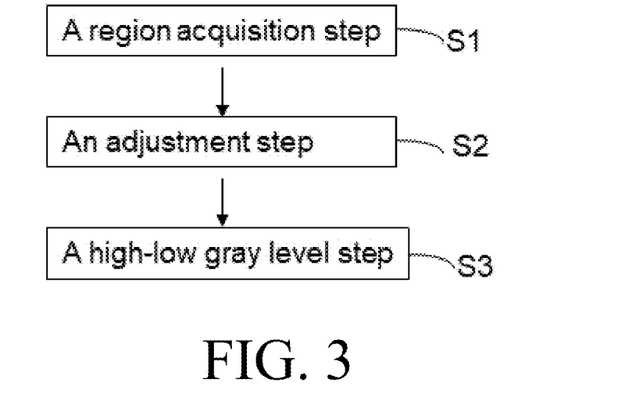
FIG. 3 is a flowchart of a panel display optimization method according to an embodiment of the present disclosure.

As shown in FIG. 3, the present disclosure provides a panel display optimization method executed by a processor of a display panel. The method comprises following steps S1 to S3.

Figure 4:
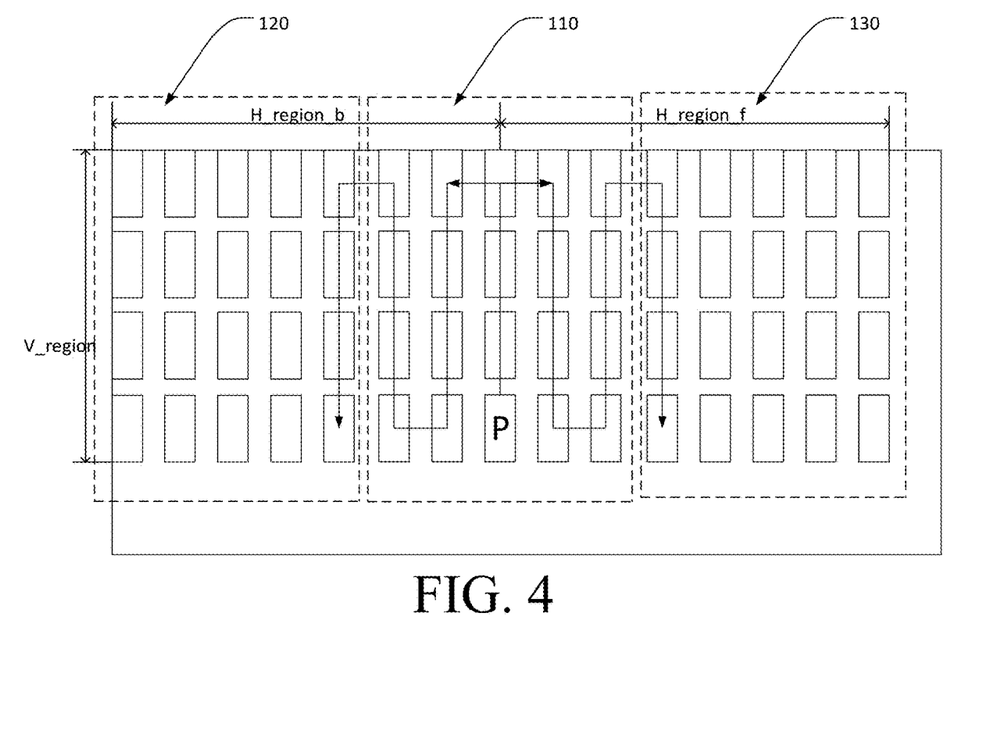
FIG. 4 is a schematic planar diagram of a first pixel region, a second pixel region, and a third pixel region according to an embodiment of the present disclosure.

Step S1: a region acquisition step, as shown in FIG. 4, acquiring a first pixel region 110, a second pixel region 120, and a third pixel region 130 of an image. Wherein, the first pixel region 110 is disposed between the second pixel region 120 and the third pixel region 130, high-low gray level values in the first pixel region 110 are 1, high-low gray level values in the second pixel region 120 and the third pixel region 130 are 0, the first pixel region 110 comprises a pixel to be processed P, the first pixel region 110 is an N*M pixel matrix, the second pixel region 120 is an N*L pixel matrix, and the third pixel region 130 is an N*K pixel matrix. High-low gray level processing needs to be performed when the high-low gray level values are 1.

Step S2: an adjustment step of adjusting a processing coefficient of a high-low gray level according to distances from the pixel to be processed P to boundaries of the first pixel region 110, the second pixel region 120, and the third pixel region 130, which is used to make a processing coefficient of a high-low gray level of a pixel to be processed having a farther boundary be greater.

Step S3: a high-low gray level step of performing high-low gray level processing on the pixel to be processed according to the processing coefficient of the high-low gray level, wherein if the processing coefficient of the high-low gray level is greater, a high-low gray level value is greater.

Figure 5:
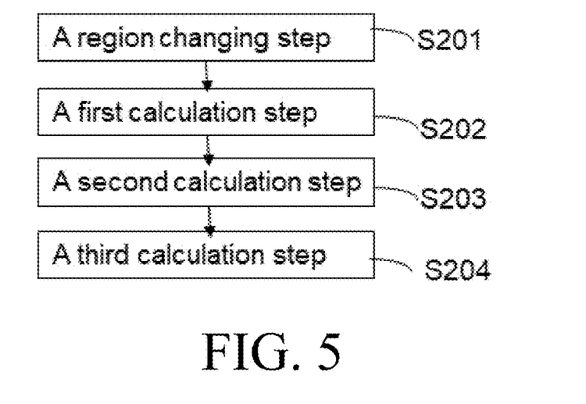
FIG. 5 is a flowchart of an adjustment step according to an embodiment of the present disclosure.

As shown in FIG. 5, specifically, the adjustment step comprises steps S201 to S204.

Figure 6:
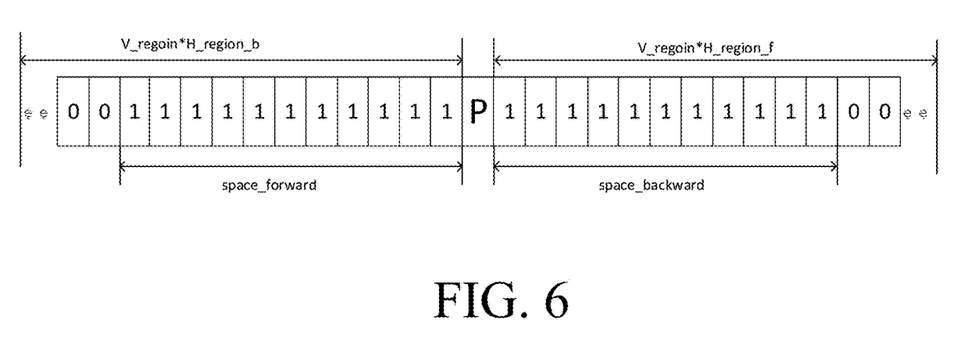
FIG. 6 is a schematic planar diagram of FIG. 4 which is expanded and converted to a one-dimensional matrix.

Step S201: a region changing step, as shown in FIG. 6, converting the first pixel region 110, the second pixel region 120, and the third pixel region 130 to a one-dimensional matrix.

Step S202: a first calculation step of calculating a forward transitional space coefficient (a) according to formula:

$$a = \frac{space\_forward}{V\_region * H\_region\_b} * P/256.$$

Wherein, space_forward is a pixel distance from the pixel to be processed P toward the second pixel region 120 in the one-dimensional matrix, H_region_b is a pixel distance from the pixel to be processed P to the boundary of the second pixel region 120 in the N-dimensional matrix of the region acquisition step, V_region is N pixel distances, and P is a forward control factor having a value of (0,1).

Step S203: a second calculation step of calculating a backward transitional space coefficient (b) according to formula:

$$b = \frac{space\_backward}{V\_region * H\_region\_f} * Q/256.$$

Wherein, space_backward is a pixel distance from the pixel to be processed P toward the third pixel region 130 in the one-dimensional matrix, H_region_f is a pixel distance from the pixel to be processed P to the boundary of the third pixel region 130 in the N-dimensional matrix of the region acquisition step, V_region is the N pixel distances, and Q is a backward control factor having a value of (0,1).

Step S204: a third calculation step of calculating the processing coefficient of the high-low gray level of the pixel to be processed according to formula: c=a*b.

In the region changing step, the conversion method is performed based on the pixel to be processed P as a central point expanding to two sides in a same moving direction, as shown by the moving directions of the arrows in FIG. 4.

The second pixel region 120 and the third pixel region 130 are bilaterally symmetrical about the first pixel region 110.

Before the region acquisition step, the method further comprises following steps.

A preparation step of providing a display panel. Wherein, the display panel displays the image, and a first pixel region requiring the high-low gray level processing is detected by a color detection system of the display panel.

The present disclosure provides a panel display optimization method, which is used to make processing coefficients of high-low gray levels of pixels to be processed having farther boundaries be greater according to distances from the pixels to be processed to the boundaries of the first pixel region, the second pixel region, and the third pixel region, that is, according to forward transitional spaces and backward transitional spaces to adjust the processing coefficients of the high-low gray levels. It further reduces overall graininess of the panel and improves visual quality of the panel after performing high-low gray level processing on adjusted pixels.

Figure 7:
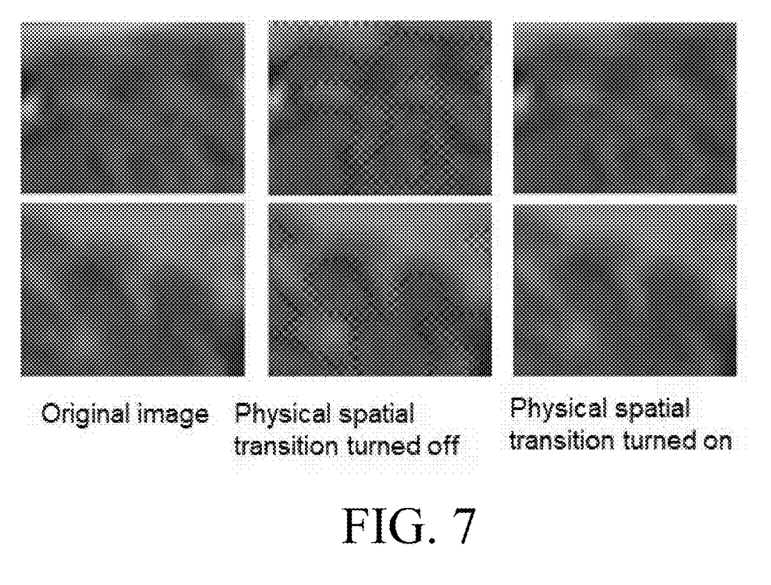
FIG. 7 is a comparative image of after processing by the present disclosure and after processing by current technology.

As shown in FIG. 7, graininess of the image is significantly reduced and the visual quality of the panel is improved after processing a spatial transition according to the present disclosure.

The present disclosure further provides a display panel which comprises a panel display optimization system 300 and a color detection system.

Figure 8:
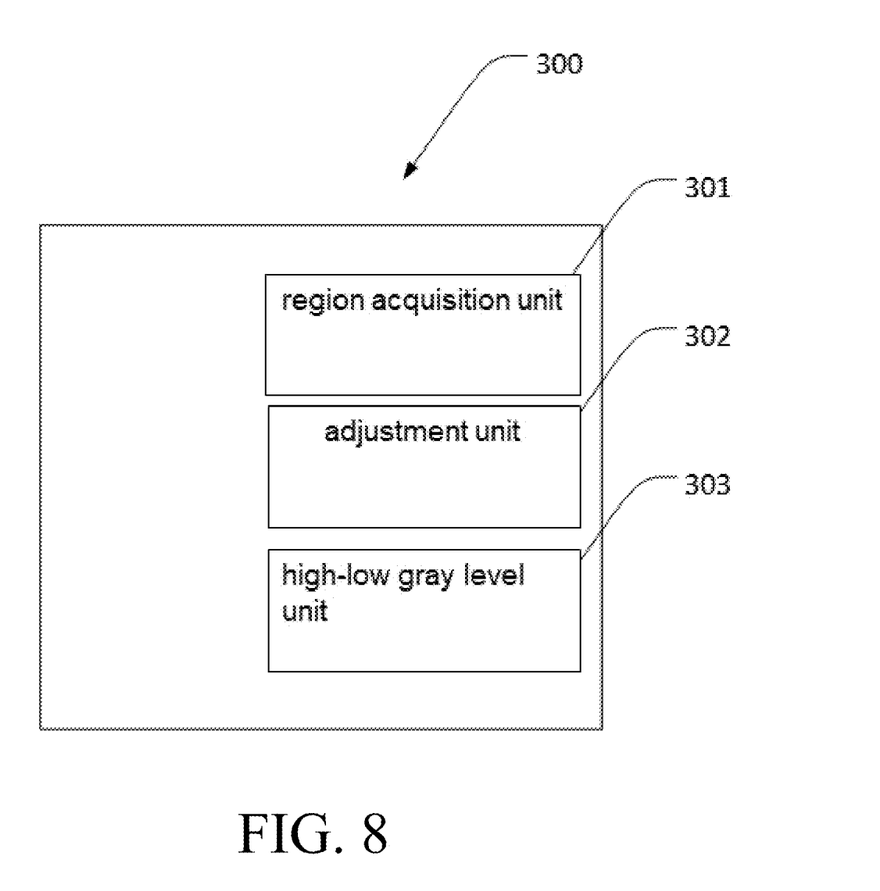
FIG. 8 is a functional block diagram of a panel display optimization system according to an embodiment of the present disclosure.

As shown in FIG. 8, the panel display optimization system 300 includes a region acquisition unit 301, an adjustment unit 302, and a high-low gray level unit 303.

The region acquisition unit 301 is configured to acquire a first pixel region, a second pixel region, and a third pixel region of an image. Wherein, the first pixel region is disposed between the second pixel region and the third pixel region, gray level values in the first pixel region are 1, gray level values in the second pixel region and the third pixel region are 0, the first pixel region comprises a pixel to be processed, the first pixel region is an N*M pixel matrix, the second pixel region is an N*L pixel matrix, and the third pixel region is an N*K pixel matrix.

The adjustment unit 302 is configured to adjust a processing coefficient of a high-low gray level according to distances from the pixel to be processed to boundaries of the first pixel region, the second pixel region, and the third pixel region, thereby making an extent of a high-low gray level of a pixel to be processed having a farther boundary be greater.

Figure 9:
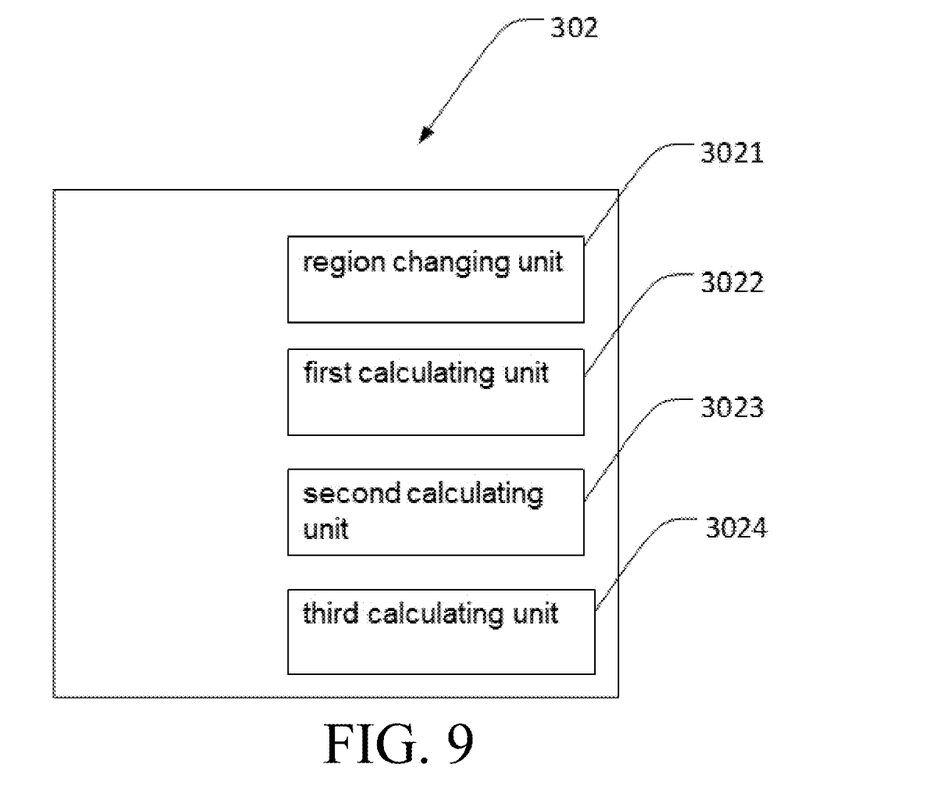
FIG. 9 is a functional block diagram of an adjustment unit according to an embodiment of the present disclosure.

As shown in FIG. 9, the adjustment unit 302 includes a region changing unit 3021, a first calculating unit 3022, a second calculating unit 3023, and a third calculating unit 3024.

The region changing unit 3021 is configured to convert the first pixel region, the second pixel region, and the third pixel region to a one-dimensional matrix.

The first calculating unit 3022 is configured to calculate a forward transitional space coefficient (a) according to formula:

$$a = \frac{space\_forward}{V\_region * H\_region\_b} * P/256.$$

Wherein, space_forward is a pixel distance from the pixel to be processed toward the second pixel region in the one-dimensional matrix, H_region_b is a pixel distance from the pixel to be processed to the boundary of the second pixel region in the N-dimensional matrix of the region acquisition step, V_region is N pixel distances.

The second calculating unit 3023 is configured to calculate a backward transitional space coefficient (b) according to formula: space_backward $$b = \frac{space\_backward}{V\_region * H\_region\_f} * Q/256.$$

Wherein, space_backward is a pixel distance from the pixel to be processed toward the third pixel region in the one-dimensional matrix, H_region_f is a pixel distance from the pixel to be processed to the boundary of the third pixel region in the N-dimensional matrix of the region acquisition step, V_region is the N pixel distances.

The third calculating unit 3024 is configured to calculate the processing coefficient of the high-low gray level of the pixel to be processed according to formula: c=a*b.

The high-low gray level unit 303 is configured to perform high-low gray level processing on the pixel to be processed according to the processing coefficient of the high-low gray level.

When the display panel displays the image, the color detection system is used to detect the first pixel region requiring the high-low gray level processing.

The region acquisition unit 301, the adjustment unit 302, and the high-low gray level unit 303 are integrated into a circuit board.

The present disclosure further provides a storage medium. The storage medium stores a computer program, which can achieve the panel display optimization method when the processor executes the computer program.

The above are only preferred embodiments of the present disclosure and are not intended to limit the present disclosure. It is understood that many changes and modifications to the described embodiment can be carried out without departing from the scope and the spirit of the disclosure that is intended to be limited only by the appended claims.

The technical scope of the present disclosure is not limited to the content in the description, and those skilled in the art can make various variations and modifications to the embodiments without departing from the technical idea of the present disclosure, and these variations and modifications are should be within the scope of the present disclosure.

What is claimed is:

1. A panel display optimization method, comprising following steps:
    a region acquisition step of acquiring a first pixel region, a second pixel region, and a third pixel region of an image, wherein the first pixel region is disposed between the second pixel region and the third pixel region, high-low gray level values in the first pixel region are 1, high-low gray level values in the second pixel region and the third pixel region are 0, the first pixel region comprises a pixel to be processed, the first pixel region is an N*M pixel matrix, the second pixel region is an N*L pixel matrix, and the third pixel region is an N*K pixel matrix;
    an adjustment step of adjusting a processing coefficient of a high-low gray level according to pixel distances from the pixel to be processed to boundaries of the first pixel region, the second pixel region, and the third pixel region, wherein if the pixel distances from the pixel to be processed to the boundaries of the first pixel region, the second pixel region, and the third pixel region are greater, the processing coefficient of the high-low gray level is greater;
    a high-low gray level step of performing high-low gray level processing on the pixel to be processed according to the processing coefficient of the high-low gray level, wherein if the processing coefficient of the high-low gray level is greater, a high-low gray level value is greater;
    a region changing step of converting the first pixel region, the second pixel region, and the third pixel region to a one-dimensional matrix; and
    a first calculation step of calculating a forward transitional space coefficient (a) according to formula:

$$a = \frac{\text{space\_forward}}{V\_\text{region} * H\_\text{region\_b}} * P/256,$$

wherein space forward is a pixel distance from the pixel to be processed toward the second pixel region in the one-dimensional matrix, H region b is a pixel distance from the pixel to be processed to the boundary of the second pixel region in the N*L pixel matrix of the region acquisition step, V region is N pixel distances, and P is a forward control factor having a value of (0,1).

2. A panel display optimization method according to claim 1,
    Wherein the adjustment step comprises:

$$a = \frac{\text{space\_forward}}{V\_\text{region} * H\_\text{region\_b}} * P/256,$$

a second calculation step of calculating a backward transitional space coefficient (b) according to formula:

$$b = \frac{\text{space\_backward}}{V\_\text{region} * H\_\text{region\_f}} * Q/256,$$

wherein space_backward is a pixel distance from the pixel to be processed toward the third pixel region in the one-dimensional matrix, H_region_f is a pixel distance from the pixel to be processed to the boundary of the third pixel region in the N*K pixel matrix of the region acquisition step, V_region is the N pixel distances, and Q is a backward control factor having a value of (0,1); and
    a third calculation step of calculating the processing coefficient (c) of the high-low gray level of the pixel to be processed according to formula: c=a*b.

3. The panel display optimization method according to claim 2, wherein in the region changing step, the conversion is performed based on the pixel to be processed as a central point expanding to two sides in a same moving direction.

4. The panel display optimization method according to claim 1,
    wherein the second pixel region and the third pixel region are bilaterally symmetrical about the first pixel region.

5. The panel display optimization method according to claim 1,
    wherein before the region acquisition step, the method further comprises:
    a preparation step of providing a display panel, wherein the display panel displays the image, and the first pixel region requiring the high-low gray level processing is detected by a color detection system of the display panel.

6. A display panel, comprising a panel display optimization system, wherein the panel display optimization system comprises:
    a region acquisition unit configured to acquire a first pixel region, a second pixel region, and a third pixel region of an image, wherein the first pixel region is disposed between the second pixel region and the third pixel region, high-low gray level values in the first pixel region are 1, high- low gray level values in the second pixel region and the third pixel region are 0, the first pixel region comprises a pixel to be processed, the first pixel region is an N*M pixel matrix, the second pixel region is an N*L pixel matrix, and the third pixel region is an N*K pixel matrix;

an adjustment unit configured to adjust a processing coefficient of a high-low gray level according to pixel distances from the pixel to be processed to boundaries of the first pixel region, the second pixel region, and the third pixel region, wherein if the pixel distances from the pixel to be processed to the boundaries of the first pixel region, the second pixel region, and the third pixel region are greater, the processing coefficient of the high-low gray level is greater;

a high-low gray level unit configured to perform high-low gray level processing on the pixel to be processed according to the processing coefficient of the high-low gray level;

a region changing unit configured to convert the first pixel region, the second pixel region, and the third pixel region to a one-dimensional matrix; and a first calculation unit configured to calculate a forward transitional space coefficient (a) according to formula:

$$a = \frac{\text{space\_forward}}{V\_region * H\_region\_b} * P/256,$$

wherein space forward is a pixel distance from the pixel to be processed toward the second pixel region in the one-dimensional matrix, H region b is a pixel distance from the pixel to be processed to the boundary of the second pixel region in the N*L pixel matrix, V region is N pixel distances, and P is a forward control factor having a value of (0,1).

7. The display panel according to claim 6, comprising:
a color detection system configured to detect the first pixel region requiring the high-low gray level processing when the display panel displays the image.

8. The display panel according to claim 6, wherein the region acquisition unit, the adjustment unit, and the high-low gray level unit are integrated into a circuit board.

9. A display panel according to claim 6, wherein the adjustment unit comprises:

$$a = \frac{\text{space\_forward}}{V\_region * H\_region\_b} * P/256,$$

a second calculation unit configured to calculate a backward transitional space coefficient (b) according to formula:

$$b = \frac{\text{space\_backward}}{V\_region * H\_region\_f} * Q/256,$$

wherein space_backward is a pixel distance from the pixel to be processed toward the third pixel region in the one-dimensional matrix, H_region_f is a pixel distance from the pixel to be processed to the boundary of the third pixel region in the N*K pixel matrix, V_region is the N pixel distances, and Q is a backward control factor having a value of (0,1); and a third calculation unit configured to calculate the processing coefficient (c) of the high-low gray level of the pixel to be processed according to formula: c=a*b.

* * * * *